Dec. 19, 1967

F. L. BISHOP 3,359,125

RADIATION INDICATING GLASS

Filed April 17, 1963

INVENTOR.
FREDERIC L. BISHOP
BY
E. J. Holler &
W. A. Schaich
ATTORNEYS

3,359,125
RADIATION INDICATING GLASS
Frederic L. Bishop, Toledo, Ohio, assignor to Owens-Illinois, Inc., a corporation of Ohio
Filed Apr. 17, 1963, Ser. No. 273,647
12 Claims. (Cl. 106—54)

The present invention relates broadly to the glass art. More particularly, the present invention relates to a novel glass composition containing, by reason of its ingredients, integral indicia of an exposure to electromagnetic radiation.

The present invention also relates to containers formed of a glass composition having the desirable indicia attributes referred to above and described in more detail hereinafter.

It is known that glass compositions can be modified to include certain elements which are subject to a change in oxidation state upon exposure to certain radiations. These glass compositions have found use in the forming of containers ideally serving as receptacles for certain products which are desirably sterilized by exposure to radiation. The advantage alleged for such container is that they will exhibit a color change upon such exposure (by reason of the change in oxidation state) so that the fact that the container and its contents have been exposed to sterilizing radiation is readily ascertainable.

In general, products which are desirably sterilized by exposure to radiation include various drugs, medical preparations, serums, vaccines, pills, bandages, hypodermic syringes, needles, sutures, clamps, and a variety of other like and associate products. It is also frequently desirable to sterilize food and other products by exposure to electromagnetic and/or particulate radiation.

Unfortunately, the glasses that have been used heretofore in forming packaging containers have been found to experience a "browning" effect upon exposure to the radiation. This "browning" effect is observed as a definite brown color which develops in the glass. As a consequence, the contents cannot be viewed clearly or accurately and the package as a whole is most unattractive.

Additionally, glasses which have been formulated to include certain elements in order that a particular and definite color will develop upon exposure to radiation are undesirable, since the coloration produced upon exposure to the radiation masks the true color of the product contained in the receptacle formed of the glass. This is very undesirable since many manufacturers utilize color coding as an identification aid in the marketing of various drugs, powdered preparations, pills, capsules, and the like. As a consequence, while the color change which develops in the glass provides ready indicia of the fact that the receptacle and its contents have been sterilized by exposure to radiation, at the same time the contents cannot be determined with certainty since the color of the product is masked and the color coding identification becomes useless. One of the known glass compositions is so formulated that a generally purple color develops upon exposure of the receptacle and its contents to electromagnetic radiation. Obviously, a purple coloration plus any browning discoloration masks the true coloration of items within a container formed of such a glass.

It is, accordingly, a general object of the present invention to provide a glass composition which has a markedly reduced propensity to develop "browning" upon exposure to a sterilizing dosage of electromagnetic and/or particulate radiation.

It is also an object of the present invention to provide a glass composition which is formulated in such fashion that it will undergo an unobjectionable color change upon exposure to electromagnetic radiation.

It is a particular object of the present invention to provide a glass of such composition that containers formed thereof serve ideally as receptacles for products which are desirably sterilized by exposure to radiation; the container by reason of the formulation undergoing a color change to a final generally neutral gray, whereby the contents of the receptacle formed thereof can be viewed in their relatively true coloration.

It is still another object of the present invention to provide a method of producing a glass-enclosed package of radiation sterilized products; said package including integral non-objectionable indicia of the fact of the packages' exposure to a sterilizing dose of electromagnetic radiation.

The foregoing, as well as other objects of the present invention, will become apparent to those skilled in the art from the following detailed description taken in conjunction with the annexed sheet of drawings on which there is presented, for purposes of illustration only, several embodiments of the present invention.

The present invention envisions a glass composition which includes, in addition to the usual silicate glass-forming constituents, specific amounts of manganese oxide and cobalt oxide, with said oxides being in a particular range of relative proportions, one to the other. A glass container formed of such a composition will be found to possess a slightly bluish coloration which, on exposure to electromagnetic radiation, will disappear or convert to a generally neutral gray coloration. The amount of manganese oxide and cobalt oxide should be held to within fairly closely controlled limits and the total is maintained at an extremely low level in order that the desirable color indicia and convertibility of same is assured.

Figure 1:
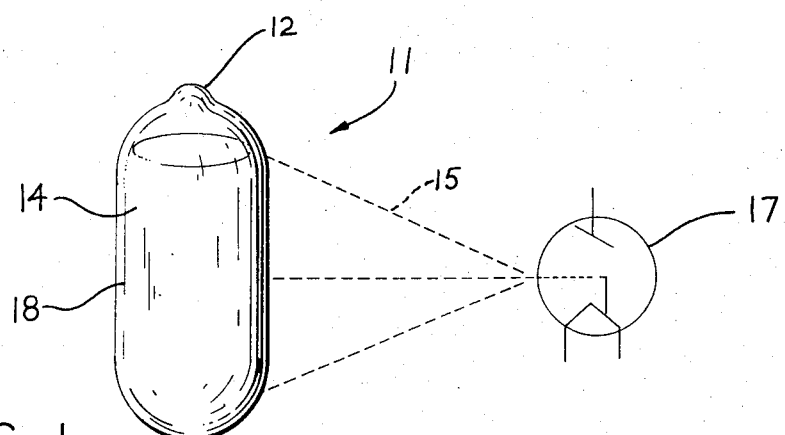
FIG. 1 is a side elevation view of a sealed ampoule formed of a glass composition in accordance with the present invention; the container shown being subjected to exposure to sterilization radiation.

Referring now more particularly to the invention, there is disclosed in FIG. 1 an ampoule 11 sealed as at 12 to completely isolate the liquid vaccine or serum 14 contained therewithin. The ampoule is located so that the radiation 15 emanating from an electromagnetic radiation source 17 is focused thereon, whereby the neutral gray coloration will develop in the glass walls 18 of the ampoule formed of a glass composition in accordance with the present invention.

Figure 2:
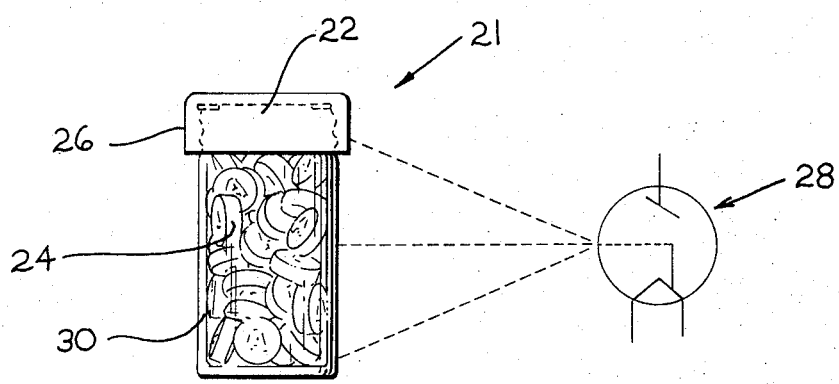
FIG. 2 is a side elevation view of a capped, open-ended vial formulated of a glass composition in accordance with the teachings of the present invention.

FIG. 2 discloses a glass cylinder or vial 21 having one open end 22. The cylinder contains a plurality of pills 24 and a plastic snap cap 26 (fabricated, for example, of polyethylene) has been affixed to the open end to effectively isolate the pills from the outside atmosphere. As illustrated, the container 21 is being exposed to an electromagnetic radiation source 28, similar to that disclosed in FIG. 1, whereby the radiation or particles of energy effect a color change in the walls 30 and at the same time sterilizer the pills 24.

Generally, sterilizing radiation may be defined as an electromagnetic radiation having a wavelength of less than 3 angstrom units. The length of exposure to the radiation necessary to effect sterilization will vary, depending upon the degree of contamination of the product to be sterilized, the amount of product, the distance between the item to be sterilized and the source, and a number of other factors; all of which are known in the radiation-sterilizing art and need not be discussed herein. Electromagnetic radiation includes X-rays and gamma rays. Particulate radiation, such as beta particles, may also be used for sterilization, provided that they have the required energy. A commercial generator of sterilizing radiation is the Van de Graff generator which accelerates high energy particles to a level wherein they are useful in the framework of the present invention.

It will be appreciated that the glass container for containing materials, items and products desirably sterilized by exposure to high energy radiation may take a variety of forms, shapes, contours and include a variety of forms of openings. Some products will be desirably packaged in an ampoule such as that disclosed in FIG. 1, while others will be desirably contained in an open-ended cylinder as shown in FIG. 2. Others may take the form of a glass jar, e.g. as in the case of packaging food desirably sterilized by electromagnetic radiation.

As indicated hereinabove, a glass in accordance with the present invention is found to be slightly blue in color and, furthermore, such a glass will be found, upon exposure to radiation, to lose the slight bluish color with contemporaneous development of a generally light shade of neutral gray coloration. A particular glass exhibiting the foregoing characteristics has the analyzed composition set forth in Table 1 below.

TABLE 1

| | Percent |
|---|---|
| $SiO_2$ | 67.500 |
| $B_2O_3$ | 1.400 |
| $Al_2O_3$ | 2.600 |
| $Na_2O$ | 15.400 |
| $K_2O$ | 0.600 |
| $CaO+MgO$ | 9.500 |
| $BaO$ | 2.000 |
| $MnO$ | 0.100 |
| $CoO$ | 0.005 |

The glass composition set forth in Table 1 is a typical soda lime glass except for the specified amounts of manganese oxide (MnO) and cobalt oxide (CoO). The glass set forth in Table 1 has an annealing point of 520° C., a strain point of 490° C., an expansion coefficient in the range 0 to 300° C. of $93 \times 10^7/°$ C., a density of 2.53 gm./cc. and a refractive index ($n_D$) of 1.52.

Another glass exhibiting the characteristics set forth hereinabove with respect to color change, upon exposure to radiation, and the development of a generally unobjectionable neutral gray coloration has the analyzed composition set forth in Table 2 below.

TABLE 2

| | Percent |
|---|---|
| $SiO_2$ | 73.200 |
| $B_2O_3$ | 9.500 |
| $Al_2O_3$ | 6.600 |
| $Na_2O$ | 6.400 |
| $K_2O$ | 0.600 |
| $CaO+MgO$ | 1.400 |
| $BaO$ | 2.200 |
| $MnO$ | 0.100 |
| $CoO$ | 0.005 |

This glass of Table 2 contains boric oxide to enhance chemical durability, making it particularly useful for enclosing liquid products desirably sterilized by exposure to electromagnetic radiation. Such liquid products include serums, medicines, vaccines, certain liquid foods, and the like. The glass of Table 1, on the other hand, is readily usable in applications where chemical durability is not essential as, for example, dry products including powders, pills, capsules, dry foods, and the like. The glass set forth in Table 2 has a softening point of 795° C., an annealing point of 574° C., a strain point of 542° C., an expansion coefficient in the range 0 to 300° C. of $49 \times 10^7/°$ C., a density of 2.36 gm./cc. and a refractive index ($n_D$) of 1.49. The glass of Table 2 may be generally described as a borosilicate type, that is, one containing from 0.05 to 28.0% $B_2O_3$, but is characterized for purposes of this invention by reason of its particular content of manganese oxide and cobalt oxide, both of which are present in very minor amounts and in particular proportions. A glass in accordance with the analyzed composition set forth in Table 2 was exposed to an X-ray source capable of subjecting the glass to a dosage amounting to 4 megarads. Prior to exposure, it was observed that the glass was a slight or light blue in color. Upon exposure to the dosage indicated, its color had disappeared and a very slight neutral gray color developed. The percent transmittance characteristics of the glass, 24 hours after exposure to the X-ray, was determined in the wavelength range 400 to 700 millimicrons (e.g. 4 to 7000 angstrom units). This transmittance data was obtained using a Beckman Spectrophotometer Model DV with a wavelength range of 0.22 to 1.2 microns. A plot of the determinations revealed a generally flat curve, thereby indicating the generally neutral gray coloration. Generally, similar results are obtained with a glass composition similar to that disclosed in Table 2, excepting that the cobalt oxide content is reduced to 0.002%, while the manganese oxide content is reduced down to as low as 0.04%. Accordingly, it has been determined that glass compositions exhibiting the desirable color feature, in particular the development of neutral gray coloration, can be obtained by the inclusion of cobalt oxide and manganese oxide in the range of 0.002 to 0.005% and 0.04 to 0.10%, respectively.

It has been determined, in accordance with the present invention, that the coloration effects are most striking where the glass composition is formulated to be essentially lead free. It has additionally been determined that it is likewise most preferred that the glass composition not contain not more than a normal level of iron oxide, e.g. not more than about 0.02 weight percent. Exactly why the combination of the manganese oxide and cobalt oxide operate to produce the desirable coloration effects described hereinabove is not known.

Most preferably, in accordance with the present invention, the cobalt oxide and manganese oxide should be maintained within a particular range as set forth hereinabove. In addition, it has been determined that most desirably the ratio of manganese oxide and cobalt oxide should be controlled so as to fall within particular values. Thus, it has been determined that generally the manganese oxide/cobalt oxide ratio should fall within the range 8 to 1 to 50 to 1. Preferably, the manganese oxide and cobalt oxide should be present in such amounts relatively that they fall within the range of 15 to 1 to 25 to 1. Most ideally, the manganese oxide and cobalt oxide should be present in the amounts as follows: 0.005% cobalt oxide and 0.10% manganese oxide, which yields a manganese oxide/cobalt oxide ratio of 20. It is generally observed that the most desirable color development is found in the latter proportions, although the ranges as above specified are productive of a coloration development which is acceptable and an improvement over previous experience.

Glass compositions, in accordance with the present invention, may be formulated to give the beneficial color effects noted hereinabove with lesser amounts of manganese oxide and cobalt oxide if the glass composition includes additionally cerium oxide ($CeO_2$) in an amount ranging up to about 0.2%. Thus, it has been determined that when cerium oxide is included in the glass composition, the cobalt oxide should be present in an amount such that it will constitute from 0.002 to 0.0035%, while the manganese oxide should be present in an amount such that it will constitute from 0.04 to 0.07% of the total oxide content.

A number of metallic oxides known to possess the property of being easily changed with respect to its oxidation state were investigated alone and in combination with the cobalt oxide and manganese oxide as set forth in the description of the present invention hereinabove. Unfortunately, it was found that only the particular combination of cobalt oxide and manganese oxide in the relative proportions enumerated hereinabove were effective in producing a glass having the unique coloration effects noted.

Glass containers formed of glass compositions inclusive of manganese oxide and cobalt oxide in the particular weight percent amount set forth hereinabove are extremely desirable as receptacles of medicines, vaccines, drugs, and the like, desirably sterilized by exposure to high energy radiation. The containers, vials, ampoules, and the like, formed of this glass possess an inherent and integral light blue coloration which is very pleasing to the eye and at the same time distinctive. Upon insertion of the item to be sterilized within the glass and the sealing of the container, either by capping or fusion sealing, the package is exposed to radiation of sufficient intensity to sterilize the contents. Immediately and contemporaneously with this exposure, the glass experiences a color change characterized by a disappearance of the pleasing and distinctive light blue coloration and the development of a coloration ranging from substantially colorless to a light neutral gray coloration. The products within the container of such coloration may be viewed easily and any color coding employed by the manufacturer of the contents may be readily distinguished and the nature of the goods determined with extreme accuracy, since no color distortion results as in the case with containers designed and formulated to develop a blue or purple or other objectionable color upon exposure to sterilizing radiation.

It will be appreciated that the practice of the present invention may be easily and simply accomplished since it requires only a careful control of the weight percent and relative proportion of two ingredients, namely, cobalt oxide and manganese oxide. In one embodiment, of course, a third ingredient is employed, namely, cerium oxide.

It is intended that modifications, which are obviously suggested by the foregoing to those skilled in the art, are to be included within the scope of the invention unless particularly delimited by the appended claims.

I claim:

1. A glass composition selected from the group consisting of soda lime glasses and borosilicate glasses, said glass composition including, as sole colorizing agents, a combination of oxides selected from the group consisting of manganese oxide, cobalt oxide and cerium oxide, said combination always including manganese oxide and cobalt oxide in the weight range of from 0.04 to 0.10% and 0.002 to 0.005% respectively, based on the total glass forming oxide constituents, said cerium oxide measuring from 0 to 0.2% by weight based on the total glass forming oxide constituents, said glass composition thereby yielding a glass exhibiting a slight blue coloration, which coloration changes to a color ranging from colorless to a light neutral gray upon exposure of the glass to sterilizing radiation.

2. A glass composition as claimed in claim 1, wherein said manganese oxide (MnO) and cobalt oxide (CoO) are present in such amount that the MnO/CoO ratio on a weight basis ranges from about 8.0 to about 50.0.

3. A glass composition as claimed in claim 2, wherein the MnO/CoO ratio ranges from about 15 to about 25.

4. A glass composition as claimed in claim 3, wherein the MnO/CoO ratio is about 20.

5. A glass composition as claimed in claim 1, wherein the MnO and CoO are present in the weight range 0.04 to 0.07% and 0.002 to 0.0035% respectively.

6. A glass container formed of the glass composition of claim 1.

7. A glass container formed of the glass composition of claim 2.

8. A glass container formed of the glass composition of claim 3.

9. A glass container formed of the glass composition of cliam 4.

10. A glass container formed of the glass composition of claim 5.

11. A glass container formed of a glass composition having a compositional analysis essentially as follows:

| | Percent |
|---|---|
| $SiO_2$ | 67.500 |
| $B_2O_3$ | 1.400 |
| $Al_2O_3$ | 2.600 |
| $Na_2O$ | 15.400 |
| $K_2O$ | 0.600 |
| $CaO+MgO$ | 9.500 |
| $BaO$ | 2.000 |
| $MnO$ | 0.100 |
| $CoO$ | 0.005 |

12. A glass container formed of a glass composition having a compositional analysis essentially as follows:

| | Percent |
|---|---|
| $SiO_2$ | 73.200 |
| $B_2O_3$ | 9.500 |
| $Al_2O_3$ | 6.600 |
| $Na_2O$ | 6.400 |
| $K_2O$ | 0.600 |
| $CaO+MgO$ | 1.400 |
| $BaO$ | 2.200 |
| $MnO$ | 0.100 |
| $CoO$ | 0.005 |

References Cited

UNITED STATES PATENTS

| | | | |
|---|---|---|---|
| 1,726,635 | 9/1929 | Taylor | 106—52 |
| 1,830,902 | 11/1931 | Hood | 106—52 |
| 1,983,359 | 12/1934 | Fuwa et al. | 106—52 |
| 2,219,122 | 10/1940 | Weidert et al. | 106—52 |
| 2,721,941 | 10/1955 | McMaster et al. | 250—42 |
| 2,811,817 | 11/1957 | Mojonnier | 53—37 |
| 2,848,854 | 8/1958 | Rado | 53—37 |
| 2,876,120 | 3/1959 | Macklan | 106—47 |
| 2,946,694 | 7/1960 | Labino | 106—47 |
| 3,173,850 | 3/1965 | Hood | 204—157 |

FOREIGN PATENTS 3,623,865  9/1961  Japan.

HELEN M. McCARTHY, *Primary Examiner.*

THERON E. CONDON, *Examiner.*

J. M. CASKIE, *Assistant Examiner.*